(12) United States Patent
Blondel et al.

(10) Patent No.: US 8,906,117 B2
(45) Date of Patent: Dec. 9, 2014

(54) PROCESS FOR THE COMBINED REGENERATION OF SOLUBLE SALTS CONTAINED IN A RESIDUE OF AN INDUSTRIAL PROCESS

(75) Inventors: Jean-Marie Blondel, Etterbeek (BE); Pierluigi Cassaghi, Villefontaine (FR); Cedric Humblot, Fontenay-sous-Bois (FR)

(73) Assignee: Solvay SA, Brussels (BE)

( * ) Notice: Subject to any disclaimer, the term of this patent is extended or adjusted under 35 U.S.C. 154(b) by 240 days.

(21) Appl. No.: 13/502,574

(22) PCT Filed: Oct. 20, 2010

(86) PCT No.: PCT/EP2010/065783
§ 371 (c)(1),
(2), (4) Date: Apr. 18, 2012

(87) PCT Pub. No.: WO2011/048135
PCT Pub. Date: Apr. 28, 2011

(65) Prior Publication Data
US 2012/0205253 A1    Aug. 16, 2012

(30) Foreign Application Priority Data
Oct. 20, 2009   (FR) ..................................... 09 05036

(51) Int. Cl.
*B01D 9/00* (2006.01)
*C01D 3/08* (2006.01)

(52) U.S. Cl.
CPC ............... *B01D 9/0036* (2013.01); *C01D 3/08* (2013.01)
USPC .............. 23/297; 423/166; 423/184; 423/197

(58) Field of Classification Search
None
See application file for complete search history.

(56) References Cited

U.S. PATENT DOCUMENTS

| | | | |
|---|---|---|---|
| 1,402,173 A * | 1/1922 | Moon | ........................... 423/196 |
| 3,342,548 A | 9/1967 | Macey | |
| 3,384,459 A | 5/1968 | Carter et al. | |
| 3,429,657 A | 2/1969 | George et al. | |
| 3,647,395 A | 3/1972 | Dean | |
| 3,895,920 A | 7/1975 | Garrett | |
| 4,193,772 A | 3/1980 | Sharp | |
| 4,249,990 A | 2/1981 | Gilbert et al. | |
| 4,385,902 A | 5/1983 | Haugrud | |
| 4,997,637 A | 3/1991 | Tufts | |
| 5,176,801 A | 1/1993 | Szanto et al. | |
| 5,769,906 A | 6/1998 | Kremer et al. | |
| 6,162,408 A * | 12/2000 | Wimby | ......................... 423/184 |
| 6,319,482 B1 * | 11/2001 | Sawell et al. | .................... 423/93 |
| 6,692,720 B1 | 2/2004 | Ninane et al. | |
| 2002/0054841 A1 | 5/2002 | Nakashima et al. | |
| 2007/0277437 A1 | 12/2007 | Sheth | |

FOREIGN PATENT DOCUMENTS

| | | |
|---|---|---|
| CN | 101066768 A | 11/2007 |
| DE | 4039014 A1 | 6/1992 |
| EP | 0046829 A1 | 3/1982 |
| EP | 0584502 A2 | 3/1994 |
| FR | 2673423 A1 | 9/1992 |
| GB | 1240667 A | 7/1971 |
| JP | 6-322402 A | 11/1994 |
| JP | 11-209121 A | 8/1999 |
| JP | 2001-26418 A | 1/2001 |
| JP | 2008-50198 A | 3/2008 |
| WO | WO 96/16900 A1 | 6/1996 |
| WO | WO 2007/137381 A1 | 12/2007 |
| WO | WO 2008/060137 A1 | 5/2008 |

OTHER PUBLICATIONS

Hou, Te-Pang—"Manufacture of Soda, With Special Reference to the Ammonia Process", 1969, Hafner Publishing Company, pp. 225-250; 29 pgs.
Adeoye, G. O., et al—"Potassium Recovery From Farm Wastes for Crop Growth", 2001, Communications in Soil Science and Plant Analysis, vol. 32, Issue Nos. 15 & 16, pp. 2347-2358; 14 pgs.
Schumann, Arnold W., et al—"Chemical Evaluation of Nutrient Supply From Fly Ash-Biosolids Mixtures", 2000, Soil Science Society of America Journal, vol. 64, Issue No. 1, pp. 419-426; 8 pgs.

* cited by examiner

*Primary Examiner* — Steven Bos

(57) ABSTRACT

Process for the combined regeneration of at least two soluble salts contained in a residue of an industrial process comprising heavy metals, comprising: adding an amount of reactive aqueous solution needed to completely dissolve the salts which are desired to be regenerated to the residue; subjecting the resulting aqueous suspension to a separation to obtain an aqueous production solution on the one hand and insoluble impurities on the other hand, which are removed; successively subjected the aqueous production solution to at least two selective crystallization steps intended to crystallize, separately, the at least two soluble salts which are desired to be regenerated, which are washed, dried and regenerated separately; and adjusting the concentration of at least one of the soluble salts to be regenerated in the aqueous production solution, at the moment when such solution is subjected to the step of crystallization of this salt, to give rise to the selective crystallization of this salt, by addition of a controlled amount of this salt to the aqueous production solution upstream of the crystallization step.

20 Claims, 1 Drawing Sheet

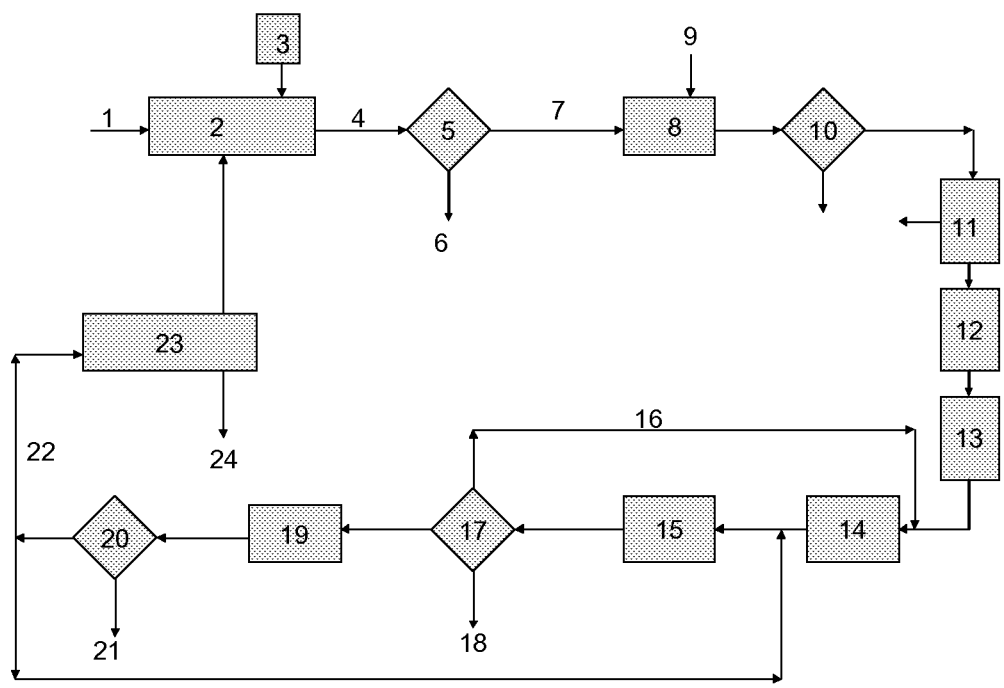

PROCESS FOR THE COMBINED REGENERATION OF SOLUBLE SALTS CONTAINED IN A RESIDUE OF AN INDUSTRIAL PROCESS

CROSS-REFERENCE TO RELATED APPLICATIONS

This application is a U.S. national stage entry under 35 U.S.C. §371 of International Application No. PCT/EP2010/065783 filed Oct. 20, 2010, which claims priority to French application No. 09.05036, filed on Oct. 20, 2009, the whole content of this application being incorporated by reference.

TECHNICAL FIELD OF THE INVENTION

The invention relates to a process for the combined regeneration of soluble salts contained in a residue of an industrial process, in particular potassium chloride and sodium chloride. More particularly, it relates to a process that makes it possible to obtain, separately, sodium chloride crystals and potassium chloride crystals from the residue.

BACKGROUND

The residues of many industrial processes contain soluble salts which make the disposal of these residues more difficult and expensive, insofar as these soluble salts run the risk of being leached out and contaminating the subsoil of the disposal site.

Particularly significant cases of such salts are the potassium salts.

Potassium chemistry is very diverse and is involved in many applications. Potassium chloride in particular (potash or potassium muriate) represents a market of more than 50 million tonnes per annum. Significant resources that have been identified are located for example in Canada, in the CIS and in Europe. The growing worldwide requirements for fertilizer in particular are responsible for a constantly increased demand for potassium resources. Potassium hydroxide, obtained mainly by electrolysis of potassium chloride, is also experiencing considerable expansion, especially in the electronics field, including the manufacture of photovoltaic cells. Generally, the applications of potassium chloride make it necessary to have a high-purity product. Potassium chloride contents of greater than 90%, or 95%, or even 99% are frequently required. Purities greater than 99% are generally necessary when the potassium chloride is subjected to electrolysis in order to produce potassium hydroxide. This is particularly the case when the potassium hydroxide is intended for electronics applications.

It would therefore be desirable to have processes that make it possible to recycle the soluble salts contained in some industrial residues, in particular potassium chloride.

In U.S. Pat. No. 3,647,395, a process is described for recovering alkali metal salts contained in the gases emitted by cement production furnaces. In this process, the vapours of alkali metal salts contained in the gases emitted are condensed and then added to water with the dust from the flue gas. The aqueous solution obtained is separated from the insoluble particles. The latter are then subjected to a succession of dissolving and separating steps. The aqueous solution finally obtained is subjected to a crystallization of the soluble salts. However, this process, which requires a large number of dissolving and separating steps, is complex and does not make it possible to separately regenerate said soluble salts.

SUMMARY OF THE INVENTION

The invention aims to provide a simpler process that makes it possible to separately regenerate soluble salts contained in industrial residues in the form of high-purity crystals.

Consequently, the invention relates to a process for the combined regeneration of at least two soluble salts contained in a residue of an industrial process comprising polyvalent metals, according to which:
a. the amount of reactive aqueous solution needed to dissolve the salts which are desired to be regenerated is brought into contact with the residue;
b. the resulting aqueous suspension is subjected to a separation so as to obtain an aqueous production solution on the one hand and insoluble impurities on the other hand, which are removed;
c. the aqueous production solution is successively subjected to at least two selective crystallization steps intended to crystallize, separately, the at least two soluble salts which are desired to be regenerated, which are washed, dried and regenerated separately;
d. the concentration of at least one of the soluble salts to be regenerated in the aqueous production solution, at the moment when it is subjected to the step of crystallization of this salt, is adjusted so as to give rise to the selective crystallization of this salt, by addition of a controlled amount of this salt to the aqueous production solution upstream of said crystallization step.

BRIEF DESCRIPTION OF THE DRAWING

For a detailed description of preferred embodiments of the invention, reference will now be made to the accompanying drawing, in which:

FIG. 1 represents a process for regenerating the potassium chloride and sodium chloride contained in residues constituted of industrial ash.

DETAILED DESCRIPTION

The process according to the invention makes it possible to regenerate at least two soluble salts contained in the residue in the form of high-purity crystals starting from residues that contain various impurities, including polyvalent metals and/or organic products. The process is especially suitable for residues that contain polyvalent heavy metals. The expression "heavy metals" is understood to mean metals whose density is at least equal to 5 $g/cm^3$, and also aluminium, beryllium, arsenic, selenium and antimony, in accordance with the generally accepted definition.

It is desirable for the residues to contain at least 15%, advantageously at least 35%, preferably 50%, more preferably 75% by weight of soluble salts, overall. Moreover, it is recommended that they contain at least 10%, advantageously at least 20%, preferably 30%, more preferably 40% by weight of soluble salts to be regenerated.

According to the invention, the amount of reactive aqueous solution needed to dissolve the salts which are desired to be regenerated is brought into contact with the residue.

The reactive aqueous solution may be substantially pure water or water recycled from an industrial process. It is however recommended to use a reactive aqueous solution comprising at least 5%, preferably 10%, more preferably 15% by weight of salts in solution. The temperature of the reactive aqueous solution may be adapted to the solubility of the salts to be regenerated. It has been observed that the process according to the invention functions well when the dissolving step is carried out at a temperature between 5 and 70° C., preferably between 10 and 50° C. Temperatures between 15 and 30° C., in particular temperatures close to 20° C., for instance between 18 and 22° C. are suitable. However, temperatures between 30 and 50° C. are preferred.

In some instances, when crystallisation of particular hydration forms are useful, temperatures between 80° C. and 100° C. can however be recommended.

The reactive solution may be brought into contact with the residue in various ways.

According to a first embodiment of the invention, the reactive solution is brought into contact with the residue by introducing the reactive solution and the residue into a reactor, preferably equipped with stirring means in order to ensure homogeneous mixing. The soluble salts then dissolve in the reactive solution. The amount of reactive solution and the residence time in the reactor must be sufficient to obtain the most complete dissolution possible of the salts to be regenerated. In this first embodiment, it is recommended that at least 95%, advantageously at least 98%, preferably 99% of these salts be dissolved. It is pointless to add an excessive amount of reactive solution. It is recommended that this amount does not exceed 1.5 times, preferably 1.25 times the minimum amount of solution needed to dissolve at least 99% of the salts.

According to a second embodiment of the invention, the reactive solution is brought into contact with the residue by leaching. In this embodiment, the reactive solution is percolated through a layer constituted of the residue. This layer is generally placed on a filter layer that makes it possible to prevent the residue particles from being entrained, during the percolation, into the resulting aqueous suspension. In this second embodiment, it is advantageous for said filter layer to possess separation properties that make it possible to carry out the separation of the insoluble particles carried out in the second step of the process according to the invention. It is then possible to carry out the contacting step and the separation step using a single device. It is recommended that the leaching allows the dissolution of at least 50%, advantageously 75%, preferably at least 90%, particularly preferably at least 95% of the soluble salts to be regenerated that are present in the residue. In certain cases, it is possible for the leaching step to be carried out at an industrial site different from that where the rest of the process is carried out.

After dissolving the salts to be regenerated, the undissolved, mainly insoluble, particles are separated from the aqueous suspension in order to form the production solution. Any separation means may be used. Use is advantageously made of any type of filter. When the average diameter of the particles in the suspension is equal to at least 10 µm (as measured by laser diffraction, for example using a SYMPATEC apparatus), it is possible to use vacuum filters such as rotary filters or belt filters. These filters are recommended when the average diameter of the particles exceeds 50 µm. When the average diameter of the particles is less than 10 µm, use is advantageously made of horizontal or vertical frame filter presses, cartridge filters or bag filters. These filters are also recommended when the average diameter of the particles ranges from 10 to 50 µm. The separation may be preceded by a settling step in order to thicken the suspension to be filtered. The settling step is preferably preceded by a flocculation step.

The separated undissolved particles are advantageously washed, in order to further eliminate any soluble salts which could be valorized. The washing can be performed during the separation, in particular when belt filters are used.

At the end of the separation of the undissolved particles, the aqueous solution obtained, referred to as an aqueous production solution, contains, in solution, at least two salts which are desired to be regenerated. In general it also contains, in solution, salts which are not desired to be regenerated, that is to say soluble impurities. The process is well suited to these situations, in particular those in which the aqueous production solution contains at least 1 g/kg, advantageously at least 5 g/kg, of such soluble impurities.

The crystallization steps may be carried out using any suitable device. Both the use of evaporator-crystallizers and crystallizers that bring about a cooling of the production solution are recommended. In evaporator-crystallizers, the crystallization is induced by the increase in concentration of the aqueous production solution following the evaporation of some of the water from the solution. Such crystallizers preferably operate at a temperature close to 100° C., when the pressure is close to atmospheric pressure. When the crystallizers operate at a pressure below atmospheric pressure, their operating temperature is consequently adapted. Multiple effect evaporators are recommended. When use is made of crystallizer-coolers, these generally operate at a temperature below 75° C., advantageously below 60° C., preferably below 50° C. The precise temperature range depends on the salt which is crystallized in the step in question. For example, in the case of the crystallization by cooling of potassium chloride, this is advantageously carried out at a temperature that ranges from 20 to 40° C., preferably from 25 to 30° C.

In one advantageous embodiment of the process according to the invention, at least one of the crystallization steps combines the use of evaporator-crystallizers and cooling crystallizers. In this embodiment, during at least one step of crystallization of a salt which is desired to be regenerated, the aqueous production solution is first introduced into an evaporator in which the temperature of the aqueous solution is brought to a value of at least 90° C., preferably at least 95° C., more preferably at least 99° C., then it is introduced into an evaporator-crystallizer and finally it is cooled to a temperature generally of less than 75° C., preferably of less than 50° C., in a second crystallizer operating at a lower temperature.

The aqueous production solution is subjected to selective crystallization steps. The expression "selective crystallization", starting from a solution that contains various salts in solution, is understood to mean a crystallization that is adjusted so that the crystals obtained are constituted essentially of a single salt, that is to say that they have a purity of at least 90% by weight, preferably at least 95%, more preferably at least 97%. The process is particularly suitable for the production of crystals having a purity of greater than 98%, preferably greater than 99%. For example, when the process is intended to regenerate potassium chloride, a purity of 99% means that the crystals comprise more than 99% by weight of potassium chloride.

According to the invention, the concentration of at least one of the soluble salts to be regenerated in the aqueous production solution, at the moment when it is subjected to the step of crystallization of this salt, is adjusted so as to give rise to the selective crystallization of this salt, by addition of a controlled amount of this salt to the aqueous production solution upstream of said crystallization step. In general, the adjustment is made by controlling the ratios of the concentrations of the various soluble salts to one another. It is advantageous for the concentration, in the solution, of said soluble salt to be greater than the concentration of the other soluble salts. It is recommended that the ratios between the concentration of said salt and concentrations of the other salts, taken separately, are each greater than 1.25, preferably greater than 1.5.

In one advantageous embodiment of the process according to the invention, the adjustment is carried out by introducing into the aqueous solution, upstream of the crystallization step, a portion of the crystals produced during this step. In this embodiment, the adjustment can therefore be carried out simply and economically, since it suffices to withdraw a portion of the crystals produced in this step and reintroduce them upstream. These crystals are then dissolved in the aqueous production solution before entering into said step. The amount of salt crystals reintroduced is controlled in order to obtain the desired concentration of this salt in the aqueous solution. In general, the withdrawal is less than 50%, preferably less than 40% and more preferably less than 30% of the crystals produced. In general, withdrawals of greater than 1%, or greater than 5%, or even 10% of the crystals produced in said step are necessary.

The process according to the invention makes it possible to regenerate many different soluble salts. By way of example, mention may be made of: sodium chloride, potassium chloride, sodium fluoride, potassium fluoride, sodium bromide, potassium bromide, sodium iodide and potassium iodide.

In one particularly advantageous embodiment of the invention, the at least two soluble salts comprise, however, potassium chloride and sodium chloride. In this embodiment, the potassium chloride concentration of the aqueous solution, at the moment when it is subjected to the potassium chloride crystallization step, is advantageously adjusted to a value of at least 1.75 times the sodium chloride concentration. In this embodiment, it is also recommended that the crystallization of the potassium chloride precedes that of the sodium chloride.

The residue generally contains soluble salts other than those that are desired to be regenerated. For example, the residues often contain substantial amounts of sulfates. There is a risk of these sulfates being found in an excessive amount in the aqueous production solution. It is then recommended to include, in the process, a supplementary step that aims to remove at least a portion of these sulfates from the aqueous production solution.

Consequently, in one particular embodiment of the process according to the invention, the residue of an industrial process contains sulfates which are removed from the aqueous production solution by reaction with a source of calcium, for example calcium chloride, and precipitation of calcium sulfate. In one advantageous variant of this embodiment, use is made, as a source of calcium, of a liquid originating from a column for distilling the mother liquor from the manufacture of sodium carbonate via the ammonia process. Examples of the composition of such a liquid are provided in the treatise by Te-Pang Hou, "Manufacture of soda", second edition, Hafner Publishing Company, 1969, page 237. After precipitation, the calcium sulfate is then separated and possibly reused. If the purity of the calcium sulfate obtained is not critical, it is possible to add the source of calcium during the step of bringing the residue into contact with the reactive solution. The calcium sulfate is then separated at the same time as the other insoluble species present in the aqueous suspension. In particular, it is advantageous for the reactive solution to comprise a liquid originating from a column for distilling the mother liquor from the manufacture of sodium carbonate via the ammonia process.

In another particular embodiment of the invention, which is recommended when the residue contains sufficient stoichiometric amounts of calcium (in particular in the form of $CaCO_3$, $Ca(OH)_2$ or $CaO$), relatively the amount of sulfates to eliminate in the form of gypsum, HCl is added to the aqueous suspension or to the aqueous reactive solution. The HCl produces $CaCl_2$ in situ, which then reacts with the sulfates to produce $CaSO_4$, which is separated. In this way a production solution with a reduced amount of sulfates is obtained.

In still another recommended embodiment, a purge containing sulfates is taken out of at least one of the crystallisers performing the crystallizing steps, the purge being recycled in the aqueous suspension or the reactive solution.

The residues comprise polyvalent metals. They generally comprise at least 5 ppm, advantageously at least 50 ppm and preferably at least 100 ppm thereof. The process is well suited to the case of residues that moreover comprise a total amount, by weight, of heavy metals of at least 5 ppm, advantageously at least 100 ppm, preferably 500 ppm, more preferably 750 ppm. The process is especially advantageous when the residues contain more than 100 ppm, in particular 250 ppm, preferably more than 500 ppm, more preferably 750 ppm, or even 1000 ppm of the amount obtained by adding up the contents, in ppm, of chromium, copper, nickel and zinc. In general, the aqueous production solution obtained after separation of the insoluble species comprises a total amount of heavy metals of less than 20 ppm, in particular of less than 10 ppm and more particularly of less than 5 ppm. The amount obtained by adding up the contents, in ppm, of chromium, copper, nickel and zinc contained in the aqueous production solution is advantageously less than 5 ppm and preferably less than 1 ppm. This is particularly the case when the separated insoluble species comprise calcium sulfate obtained by reaction with a source of calcium according to the particular embodiment of the process described above.

When the aqueous production solution contains an excessive amount of polyvalent metals, including magnesium, it is recommended to alkalinize it, which has the effect of precipitating these metals in the form of hydroxides. These precipitated hydroxides are then separated from the aqueous solution. The alkalinization is advantageously carried out at a pH between 8 and 14, where necessary by addition of an inorganic base such as sodium carbonate, potassium carbonate, potassium hydroxide or sodium hydroxide. When the aqueous production solution contains an excessive amount of calcium, it is recommended to carbonate it with a source of $CO_2$ such as carbon dioxide, sodium carbonate or potassium carbonate, and also the associated bicarbonates.

When it is desired to particularly thoroughly purify the aqueous production solution of polyvalent metals, it is advantageous to carry out a complementary purification of this solution using ion-exchange resins. The ion-exchange resins are well known in the art. They comprise a polymer backbone onto which functional groups comprising interchangeable cations are grafted. Examples of polymers that can be used for the polymer backbone include polyolefins (for example polyethylene), polymers derived from styrene (for example copolymers derived from styrene and divinylbenzene) and acrylic resins. The resin is generally present in the form of granules, in contact with which the aqueous solution to be purified of heavy metals is circulated.

In the process according to the invention, use may be made of either an H-type or Na-type or K-type resin. Resins of Na or K type (which are resins in which the interchangeable cations are sodium or potassium cations) are preferred however, since they provide, all other things remaining equal, an optimum extraction of the ions of polyvalent metals, especially of calcium.

Ion-exchange resins that are advantageous within the context of the invention are those in which the functional groups comprise sulfur ligands, such as DUOLITE® GT 73 resins (Rohm & Haas Company).

In general, exchange resins in which the functional groups comprise a ligand of nitrogen are preferred however. These may for example include compounds derived from amines or imines. Resins that are especially recommended are those comprising functional groups derived from organic acids, those comprising functional groups derived from iminodiacetic acid or from aminophosphonic acid being preferred. Examples of resins that can be used in the process according to the invention are those sold under the trademarks DUOLITE® and AMBERLITE® (Rohm & Haas Company), PUROLITE® (Purolite), DOWEX® (Dow Chemicals) and LEWATIT® (Lanxess).

The process according to the invention is also especially suitable for the treatment of residues comprising soluble organic matter, for example dioxins, furans and any soluble organic compound resulting from the combustion of household waste or even hazardous waste. In these situations, it is often recommended to treat the aqueous production solution using activated carbon. Activated carbons that have a specific surface area of at least 250 $m^2/g$, or even at least 500 $m^2/g$ are preferred. One activated carbon that is very suitable is, in particular, the activated carbon known under the trade name CECARBON®GAC 1240 which is in the form of granules of around 1 mm in diameter and which has a specific surface area of around 1000 $m^2/g$.

In the particular embodiment of the invention described above, according to which sulfates are removed from the reactive solution by precipitation of calcium sulfate, it is possible to obtain a high-purity calcium sulfate if its precipitation is preceded by some or all of the reactive aqueous solution purification operations described above. In other situations, in which the purity of the calcium sulfate is less critical, it is beneficial to coprecipitate the calcium sulfate with polyvalent metals. For this purpose, the aqueous production solution is alkalinized by adding calcium hydroxide and, optionally, sodium hydroxide or potassium hydroxide thereto. The amount of calcium hydroxide used must be at least sufficient to react with all of the sulfate anions of the aqueous medium; furthermore, the overall amount of calcium hydroxide and of sodium hydroxide or potassium hydroxide must be sufficient to produce an alkaline pH (preferably at least equal to 8) in the aqueous medium. In this way of carrying out the process, the calcium sulfate (generally in the form of gypsum) and the metal hydroxides precipitate simultaneously, which is an advantage. Indeed, it has been observed that this coprecipitation facilitates and accelerates the sedimentation of the precipitate and improves the subsequent separation of the precipitate.

The process according to the invention makes it possible to regenerate soluble salts contained in a wide variety of wastes.

In a first variant of the process according to the invention, the residue of an industrial process comprises a residue from a dry flue gas treatment using a sodium-containing reactant (trona or preferably sodium bicarbonate). The dry flue gas treatment using a sodium-containing reactant is a treatment in which the sodium-containing reactant is introduced in the solid state into the flue gas in the absence of a liquid, in particular water. In general, the sodium-containing reactant is used in the form of a powder which is injected into a stream of flue gas circulating inside a reaction chamber. In this chamber, the sodium-containing reactant decomposes the hydrogen chloride present in the flue gas, forming sodium chloride. It is advisable to use a powder of the sodium-containing reactant having a particle size that is homogeneous and as fine as possible so as to accelerate the decomposition of the hydrogen chloride. As a general rule, it is recommended to use a powder for which the average diameter of the particles is less than 50 μm. The preferred particle size corresponds to an average diameter of the particles that does not exceed 25 μm, for example between 5 and 20 μm. When the flue gas has reacted with the sodium-containing reactant, this flue gas is subjected to a filtration in order to recover the flue gas purification residue that comprises the possible fly ash present in the flue gas.

In a second variant of the process according to the invention, the residue of an industrial process comprises fly ash from a cement production process. During the production of cement, a mixture comprising limestone, clay and various additives is calcined at high temperature to produce clinker. This clinker is then ground and mixed with gypsum to obtain cement. Since the high-temperature calcining consumes a lot of energy, it is advantageous to use low-price fuels, often wastes from other processes, in order to heat the clinker. Therefore, fly ash, that is to say the ash entrained in the combustion flue gases, frequently contains soluble salts. This ash can be recycled in the cement production process, but it then leads to an increase in the content of these soluble salts in the cement obtained. It has been observed that, surprisingly, such residues comprise a large amount of potassium which the process according to the invention makes it possible to regenerate in a particularly selective manner.

In a third variant of the process according to the invention, the residue of an industrial process comprises fly ash from the combustion of plants, preferably wood, of first use or recycled, or fossil fuels. Such ash advantageously contains a total content of heavy metals that exceeds 1000 ppm.

The invention also relates to the crystals of soluble salts that can be obtained by the process according to the invention. These crystals have, as described above, a high purity. They generally have an average diameter of at least 25 μm, advantageously at least 50 μm, preferably at least 100 μm, more preferably at least 150 μm (average diameter as measured by laser diffraction, for example using a SYMPATEC apparatus). The crystals may be of rounded or even spherical shape. They advantageously have a cubic shape. They may have many applications. The crystals may be used in road snow clearing or as fertilizer. Their use in food salting or pharmaceutical utilizations is recommended. The crystals obtained are particularly suitable for producing aqueous solutions intended for electrolysis.

Consequently, the invention also relates to an embodiment of the process according to the invention in which the at least two soluble salts comprise potassium chloride and sodium chloride and the potassium chloride or sodium chloride crystals obtained by the process according to the invention are dissolved in water and the resulting aqueous solution is subjected to an electrolysis so as to produce potassium hydroxide or sodium hydroxide. This embodiment is particularly suitable for the production of potassium hydroxide.

The electrolysis is preferably carried out in a cell having a selectively ion-permeable membrane. A cell having a selectively ion-permeable membrane is an electrolysis cell comprising at least one anode chamber and at least one cathode chamber separated by at least one membrane that is substantially impermeable to liquids (mainly to aqueous solutions), but that is selectively permeable to ions.

It is preferred that the membrane of the cell is a membrane that is selectively permeable to cations. By definition, when such a membrane is brought into contact with an electrolyte between an anode and a cathode, it is passed through by cations from the electrolyte but is substantially impermeable to the transfer of anions. The aqueous solution of potassium chloride or sodium chloride is then introduced into the anode chamber of the cell and the aqueous solution of potassium hydroxide or sodium hydroxide is generated in the cathode chamber of the cell. Simultaneously, chlorine is produced in the anode chamber and hydrogen is produced in the cathode chamber.

Particularities and details of the invention will emerge from the following description of the appended FIG. 1.

FIG. 1 represents a process for regenerating the potassium chloride and sodium chloride contained in residues constituted of industrial ash. The residue (1), which contains sulfates, is dissolved in a dissolver (2) that is fed with water and with calcium chloride (3). This results in a precipitation of gypsum (6), which is removed along with the other insoluble species through a filter (5). The solution which is purified of sulfates (7) is then purified of calcium and magnesium (8) by reaction with sodium carbonate and hydroxide (9). Calcium carbonate and magnesium hydroxide are removed by passing through the filter (10). The solution which is purified of calcium and magnesium is then purified of heavy metals by treatment over ion-exchange resins (11). The super-purified solution resulting from the treatment over ion-exchange resins is purified of organic compounds by passing over an activated carbon bed (12). The solution which is super-purified and purified of organic compounds is then concentrated by heating at a temperature of 100° C. in the evaporator (13), then introduced into the evaporator-crystallizer (14) in which KCl crystals are produced. The resulting aqueous suspension is then cooled in the crystallizer (15) in order to produce an additional quantity of KCl crystals. These crystals (18) are recovered in the separator (17). The mother liquors from the crystallization of the KCl are introduced into an evaporator-crystallizer (19) in which the NaCl crystals (21) are produced. These are separated from the mother liquors (22) in the filter (20). The mother liquors are partly recovered into the dissolving step (2), after removal (23) of a purge of sulfates (24), and partly recycled upstream of the crystallizer (15). A fraction (16) of the KCl crystals is introduced upstream of the crystallizer (14), in order to adjust the concentration of KCl in the solution introduced into this crystallizer to a value equalling at least 1.75 times that of sodium chloride.

In case patents, patent applications and publications which are incorporated herein by reference would conflict with the description of the present application to the extent that it may render a term unclear, the present description shall take precedence.

EXAMPLES

The following examples serve to illustrate the invention.

Example 1

In a perfectly stirred laboratory crystallizing dish, 500 g of residues constituted of industrial ash having the composition, measured on dry residues, of Table 1, were put into suspension in 2000 g of a reactive solution, a mixed mixture of calcium chloride and sodium chloride, the composition of which appears in Table 2. The amounts used correspond approximately to the stoichiometric amounts needed to precipitate, in the form of gypsum ($CaSO_4 \cdot 2H_2O$), all of the soluble sulfates contained in the ash residues.

TABLE 1

Analysis of the residues

| Chemical species | g/kg |
|---|---|
| $K^+$ | 283.5 |
| $Ca^{++}$ | 1.9 |
| $Mg^{++}$ | 0.5 |
| $Na^+$ | 58.3 |
| $Cl^-$ | 95.3 |
| $SO_4^{--}$ | 347.5 |
| Insolubles | 178 |

TABLE 2

Analysis of the reactive solution

| Chemical species | g/kg |
|---|---|
| $Ca^{++}$ | 64.9 |
| $Na^+$ | 32.4 |
| $OH^-$ | 1.5 |
| $Cl^-$ | 95.3 |
| $SO_4^{--}$ | 0.6 |
| $H_2O$ | 805.2 |

After stirring at ambient temperature for 3 hours, the precipitation of gypsum took place and, after filtration through a Büchner-type laboratory vacuum filter, a clear aqueous production solution was collected. It then contained 3.11 g/kg of calcium that it was advisable to remove. This calcium originated from the stoichiometric excess of reactant that was initially introduced.

The aqueous production solution from the preceding step was then purified by an additional precipitation step carried out at ambient temperature by adding sodium carbonate. For this purpose, 11.5 g of $Na_2CO_3$ per kg of solution to be purified were introduced into a perfectly stirred crystallizing dish. After stirring for 30 minutes, an additional precipitation of $CaCO_3$ took place.

A second step of filtration through a Büchner-type laboratory filter made it possible to collect an aqueous production solution that was purified of sulfates and that had the composition given in Table 3:

TABLE 3

Analysis of the production solution

| Chemical species | Unit | Value |
|---|---|---|
| $Na^+$ | g/kg | 33.83 |
| $K^+$ | g/kg | 59.27 |
| $Cl^-$ | g/kg | 106 |
| $Ca^{++}$ | mg/kg | 47 |
| $SO_4^{--}$ | mg/kg | 3440 |
| Al | mg/kg | 0.02 |
| As | mg/kg | <0.02 |
| B | mg/kg | 0.62 |
| Ba | mg/kg | 1 |
| Cd | mg/kg | <0.005 |
| Co | mg/kg | <0.05 |
| Cr | mg/kg | 0.037 |
| Cu | mg/kg | 0.11 |
| Fe | mg/kg | <0.01 |
| Mg | mg/kg | 0.09 |
| Mn | mg/kg | <0.005 |
| Mo | mg/kg | 1.9 |
| Ni | mg/kg | <0.01 |
| Pb | mg/kg | 0.075 |
| Sb | mg/kg | <0.1 |
| Se | mg/kg | <0.02 |
| Si | mg/kg | 0.35 |

TABLE 3-continued

Analysis of the production solution

| Chemical species | Unit | Value |
| --- | --- | --- |
| Sn | mg/kg | 0.1 |
| Sr | mg/kg | 0.84 |
| Te | mg/kg | <0.05 |
| Ti | mg/kg | <0.005 |
| Tl | mg/kg | 11.7 |
| V | mg/kg | <0.05 |
| Zn | mg/kg | 0.015 |

In this case, the K/Na ratio in the aqueous production solution was: 59.27/33.83=1.75.

The aqueous production solution, purified of sulfates, was concentrated at 100° C. This consisted in evaporating the water contained in the solution up to the saturation point, then in crystallizing the KCl. 294 g of water were evaporated and made it possible to crystallize 58.3 g of KCl, which were recovered on a Büchner type filter thermostatically controlled at 100° C. The 545 g of residual solution had the following composition:

NaCl:173 g/kg
KCl:212 g/kg

The residual solution was then cooled in a water bath thermostatically controlled at 25° C. 62.4 g of KCl were then precipitated and were recovered on a Büchner type vacuum filter.

The 495 g of the remaining solution (mother liquors from the crystallization of KCl) had the following composition:

NaCl:195 g/kg
KCl:110 g/kg

The remaining solution (mother liquors from KCl crystallization) was heated at 100° C. in order to evaporate the water and precipitate a portion of the NaCl.

183 g of water were evaporated and made it possible to crystallize 55.3 g of NaCl, which were recovered on a Buchner type filter thermostatically controlled at 100° C.

The 233 g of final remaining solution had the following composition:

NaCl:161 g/kg
KCl:213 g/kg

Examples 2 to 5

In Examples 2 to 5 a lab filtering unit was tested. 500 grams of a residue containing the elements given in Table 4 was dissolved in 586 g of water:

TABLE 4

Residue composition of elements

| Chemical species | g/kg |
| --- | --- |
| K$^+$ | 70 |
| Ca$^{++}$ | 63 |
| Na$^+$ | 25.6 |
| Cl$^-$ | 105 |
| SO$_4^{--}$ | 21.3 |
| OH$^-$ | 47.8 |
| Insolubles | 648 |
| Not determined | 18.8 |

In Example 2, a quantity of 63 g of hydrochloric acid 2N was added to the obtained aqueous suspension, together with 55 g of NaCl and 86 g of KCl, to simulate the purge. The suspension was then subjected to a separation step in a belt filter. The production solution had the composition indicated in Table 5. The separated particles were washed until the remaining chloride was 2 g/kg.

In Example 3, it was performed as in Example 2, except that the hydrochloric acid was replaced with 74 g of a liquid originating from a column for distilling the mother liquor from the manufacture of sodium carbonate via the ammonia process ("LDS" in Table 5), having the composition given in Table 2. The amounts of NaCl and KCl were 52 g and 80 g, respectively. The dissolution was carried out in 595 g of water.

The composition of the production solution which was obtained is also given in Table 5.

In Examples 4 and 5, it was operated as in Example 3, except that the level of impurities written in bold characters in Table 5 was artificially raised by 2 ppm (for every impurities) in Example 4 and 10 ppm in Example 5. The composition of the production solution after separation in the belt filter is also given in Table 5.

Example 6

In Example 6, it was performed as in Example 3, except that the production solution was further treated by addition of a stoichiometric quantity of Na$_2$CO$_3$ in order to eliminate remaining Ca and separation of the produced CaCO$_3$, and by addition of 50 mg/l of FeCl$_2$, to remove Cr$^{VI}$. The purified solution was finally super purified through ion exchange resins Lewatit® TP 208 from Lanxess. The composition at the output of the belt filter, the separation of CaCO$_3$ and the ion exchange resins are given in Table 6.

TABLE 5

| | | Example | | | |
| --- | --- | --- | --- | --- | --- |
| | | 2 | 3 | 4 | 5 |
| Additive—SO$_4$ | | HCl | LDS | LDS | LDS |
| NaCl | g/kg | 100.6 | 95.4 | 94.1 | 87.2 |
| KCl | g/kg | 167.5 | 157.1 | 155.0 | 143.6 |
| Ca(OH)$_2$ | g/kg | 0.4 | 0.4 | 0.4 | 0.4 |
| CaCl$_2$ | g/kg | 7.5 | 7.7 | 7.6 | 7.0 |
| CaSO$_4$ | g/kg | 3.1 | 3.1 | 3.1 | 2.8 |
| Al | mg/kg | <0.04 | <0.13 | <0.11 | <0.12 |
| As | mg/kg | <0.2 | <0.13 | <0.11 | <0.12 |
| B | mg/kg | 0.05 | 0.09 | 0.61 | 2.9 |
| Ba | mg/kg | 6.7 | 8.2 | 7.7 | 8.4 |
| Bi | mg/kg | <0.04 | <0.13 | <0.11 | <0.08 |
| Ca | mg/kg | 3831 | 3903 | 3851 | 3566 |
| Cd | mg/kg | <0.04 | <0.01 | <0.03 | <0.02 |
| Co | mg/kg | <0.04 | <0.03 | <0.11 | <0.04 |
| Cr | mg/kg | 0.43 | 0.366 | 0.38 | 0.34 |
| Cu | mg/kg | <0.04 | <0.03 | <0.11 | <0.04 |
| Fe | mg/kg | <0.04 | <0.03 | <0.05 | <0.04 |
| Li | mg/kg | 1.8 | 2.13 | 3.4 | 9.8 |
| Mg | mg/kg | 0.06 | <0.01 | 0.1 | 0.05 |
| Mn | mg/kg | <0.04 | <0.01 | <0.03 | <0.02 |
| Mo | mg/kg | <0.04 | <0.03 | 0.17 | 1.3 |
| Ni | mg/kg | <0.04 | <0.03 | <0.11 | <0.04 |
| Pb | mg/kg | <0.39 | <0.13 | <0.37 | 0.34 |
| PO$_4$ | mg/kg | <0.28 | <0.53 | <1.06 | <0.77 |
| Sb | mg/kg | <0.39 | <0.37 | <0.37 | <0.37 |
| Se | mg/kg | <0.2 | 0.14 | 0.53 | 2 |
| Si | mg/kg | 0.23 | 0.34 | 0.32 | 0.2 |
| Sn | mg/kg | <0.08 | <0.08 | <0.16 | <0.04 |
| Sr | mg/kg | 44 | 61 | 41.7 | 60 |
| Ti | mg/kg | 0.04 | <0.01 | 0.1 | <0.02 |
| Tl | mg/kg | 1.9 | 1.87 | 2.9 | 8.7 |
| V | mg/kg | <0.16 | <0.05 | <0.11 | <0.19 |
| Zn | mg/kg | <0.04 | <0.01 | <0.03 | <0.02 |

TABLE 6

|    | Unit  | Belt filter | After Ca removal | After ion ex. |
|----|-------|-------------|------------------|---------------|
| Ba | mg/kg | 8.3         | 0.081            | <0.04         |
| Ca | mg/kg | 4000        | 3.5              | 1.5           |
| Cr | mg/kg | 0.25        | <0.05            | <0.04         |
| Li | mg/kg | 2.2         | 2.3              | 0.28          |
| Si | mg/kg | 0.29        | 0.58             | 1.2           |
| Sr | mg/kg | 56          | 0.27             | <0.04         |
| Tl | mg/kg | 1.8         | 1.8              | 0.46          |

The invention claimed is:

1. A process for the combined regeneration of at least two soluble salts contained in a residue of an industrial process comprising polyvalent metals, said process comprising:
   (a) bringing into contact with the residue an amount of a reactive aqueous solution to dissolve the at least two salts which are to be regenerated to form an aqueous suspension;
   (b) subjecting the resulting aqueous suspension to a separation to obtain an aqueous production solution on the one hand and insoluble impurities on the other hand, which are removed;
   (c) successively subjecting the aqueous production solution to at least two selective crystallization steps to produce, separately, crystals of the at least two soluble salts which are to be regenerated, which are washed, dried and regenerated separately; and
   (d) adjusting the concentration of at least one of the soluble salts to be regenerated in the aqueous production solution, at the moment when said aqueous production solution is subjected to crystallization of the at least one of the soluble salts to be regenerated, to obtain the selective crystallization of this salt, by addition of a controlled amount of the at least one of the soluble salts to be regenerated to the aqueous production solution upstream of said crystallization in step (c).

2. The process according to claim 1, wherein the adjustment is carried out by introducing into the aqueous production solution, upstream of said crystallization step, a portion of the crystals produced during step (d).

3. The process according to claim 1, wherein the at least two soluble salts comprise potassium chloride and sodium chloride.

4. The process according to claim 3, wherein the potassium chloride concentration of the aqueous production solution, at the moment when said aqueous production solution is subjected to the potassium chloride crystallization in step (c), is adjusted to a value of at least 1.75 times the sodium chloride concentration.

5. The process according to claim 3, wherein the crystallization of the potassium chloride precedes the crystallization of the sodium chloride.

6. The process according to claim 1, wherein the residue of an industrial process contains sulfates which are removed from the aqueous production solution by reaction with a source of calcium and precipitation of gypsum.

7. The process according to claim 1, wherein the residue of an industrial process contains calcium and sulfates which are removed from the aqueous production solution by reaction with hydrogen chloride and precipitation of gypsum.

8. The process according to claim 6, wherein the reactive aqueous solution comprises a liquid originating from a column for distilling a mother liquor from manufacture of sodium carbonate via an ammonia process.

9. The process according to claim 1, wherein the residue of an industrial process comprises a residue from a treatment of flue gases using a sodium-containing reactant.

10. The process according to claim 3, wherein the at least two soluble salts comprise potassium chloride and sodium chloride, wherein the potassium chloride crystals obtained after crystallization are dissolved in water, and wherein an aqueous solution resulting from said dissolution of potassium chloride crystals is subjected to an electrolysis so as to produce potassium hydroxide.

11. The process according to claim 1, wherein the residue of an industrial process comprises fly ash from a cement production process.

12. The process according to claim 1, wherein the residue of an industrial process comprises fly ash from the combustion of plants.

13. The process according to claim 1, wherein the residue of an industrial process comprises fly ash from the combustion of fossil fuels.

14. The process of claim 1 wherein the residue contains at least 15% by weight of soluble salts.

15. The process of claim 1 wherein the residue contains at least 10% by weight of the soluble salts to be regenerated.

16. The process of claim 1 wherein the reactive aqueous solution comprises at least 5% by weight of salts in solution.

17. The process of claim 1 wherein the amount of said reactive aqueous solution does not exceed 1.5 times the minimum amount of reactive aqueous solution needed to dissolve at least 99% by weight of the salts to be regenerated.

18. The process of claim 2 wherein less than 50% by weight of the crystals produced are withdrawn and dissolved in the aqueous production solution upstream of said crystallization step.

19. The process of claim 1 wherein the residue contains an added-up amount of chromium, copper, nickel, and zinc as polyvalent metals of at least 100 ppm.

20. The process of claim 1 wherein the aqueous production solution obtained after separation of the insoluble impurities in step (b) contains an added-up amount of chromium, copper, nickel, and zinc of less than 5 ppm.

* * * * *